US012698028B2

(12) United States Patent
Sun

(10) Patent No.: US 12,698,028 B2
(45) Date of Patent: Aug. 4, 2026

(54) MOTOR CONTROL IN AN ELECTRIC POWER STEERING

(71) Applicant: ZF Automotive UK Limited, Solihull (GB)

(72) Inventor: Xiao-Dong Sun, Solihull (GB)

(73) Assignee: ZF Automotive UK Limited, Solihull (GB)

( * ) Notice: Subject to any disclaimer, the term of this patent is extended or adjusted under 35 U.S.C. 154(b) by 465 days.

(21) Appl. No.: 18/270,040

(22) PCT Filed: Dec. 30, 2021

(86) PCT No.: PCT/GB2021/053447
§ 371 (c)(1),
(2) Date: Jun. 28, 2023

(87) PCT Pub. No.: WO2022/144551
PCT Pub. Date: Jul. 7, 2022

(65) Prior Publication Data
US 2024/0059348 A1 Feb. 22, 2024

(30) Foreign Application Priority Data
Dec. 31, 2020 (GB) ...................................... 2020840

(51) Int. Cl.
B62D 5/04 (2006.01)
B62D 6/08 (2006.01)

(52) U.S. Cl.
CPC ............. B62D 5/0463 (2013.01); B62D 6/08 (2013.01)

(58) Field of Classification Search
CPC ...... B62D 5/0463; B62D 6/08; B62D 15/025; B62D 6/00; G06N 3/084; G06N 3/02; H02P 23/0031; H02P 6/34
See application file for complete search history.

(56) References Cited

U.S. PATENT DOCUMENTS

| | | | | |
|---|---|---|---|---|
| 10,829,149 | B1 | 11/2020 | Garimella et al. | |
| 11,794,805 | B2 * | 10/2023 | Gaudszun | ............ B62D 15/021 |

(Continued)

FOREIGN PATENT DOCUMENTS

| | | |
|---|---|---|
| CN | 104836498 B | 1/2019 |
| CN | 109177744 A | 1/2019 |

(Continued)

OTHER PUBLICATIONS

International Search Report and Written Opinion for PCT/GB2021/053447 mailed Mar. 18, 2022 (11 pages).

*Primary Examiner* — Drew J Brown
(74) *Attorney, Agent, or Firm* — Kristin L. Murphy

(57) ABSTRACT

An electric power assisted steering system for a vehicle is disclosed. The electric power assisted steering system can include an electric motor configured to apply an assistance torque to a part of a steering assembly so as to assist a driver of a vehicle in turning the steering wheel, a drive circuit for the motor which selectively connects the motor phases to an electrical supply to cause current to flow in the motor phases. The amount of assistance torque applied by the motor can be a function of the current flowing in the phases of the motor. The electric power assisted steering system can include a control circuit which generates a control signal that is applied to the motor drive stage.

14 Claims, 6 Drawing Sheets

(56)                References Cited

U.S. PATENT DOCUMENTS

| | | | | |
|---|---|---|---|---|
| 2018/0201299 | A1 | 7/2018 | Ashtari | |
| 2018/0339725 | A1 * | 11/2018 | Kodera | B62D 5/046 |
| 2019/0039648 | A1 * | 2/2019 | Kitta | B62D 5/0463 |
| 2019/0202497 | A1 * | 7/2019 | Hajika | G05B 6/02 |
| 2020/0406964 | A1 * | 12/2020 | Hultén | B62D 6/008 |
| 2021/0107567 | A1 * | 4/2021 | Varunjikar | G01S 15/931 |
| 2021/0245800 | A1 * | 8/2021 | Kitazume | B62D 5/0463 |
| 2022/0009547 | A1 * | 1/2022 | Osajima | B62D 5/0463 |

FOREIGN PATENT DOCUMENTS

| | | | | | |
|---|---|---|---|---|---|
| CN | 109405846 | A | | 3/2019 | |
| CN | 109969181 | B | | 6/2020 | |
| CN | 109696181 | B | | 10/2020 | |
| CN | 116279764 | A | * | 6/2023 | B62D 5/0463 |
| CN | 118833288 | A | * | 10/2024 | B62D 6/00 |
| DE | 102017220973 | A1 | | 5/2019 | |
| GB | 2602476 | A | * | 7/2022 | G06N 3/02 |
| GB | 2602477 | A | * | 7/2022 | B60W 10/20 |
| GB | 2602478 | A | * | 7/2022 | G06N 3/084 |
| WO | WO-2022144552 | A1 | * | 7/2022 | G06N 3/0499 |

* cited by examiner

MOTOR CONTROL IN AN ELECTRIC POWER STEERING

CROSS-REFERENCE TO RELATED APPLICATIONS

This application is a national stage of International Application No. PCT/GB2021/053447, filed Dec. 30, 2021, the disclosure of which is incorporated herein by reference in its entirety, and which claimed priority to UK Patent Application No. 2020840.1, filed Dec. 31, 2020, the disclosure of which is incorporated herein by reference in its entirety.

TECHNICAL FIELD

This disclosure relates to improvements in motor control of electric power steering systems.

BACKGROUND

An electric power steering system includes an actuator, usually an electric motor that can apply a torque that assists the driver in turning the steering wheel. The motor can also be used to apply torque in varying levels to give different amounts of assistance at different vehicle speeds, and even to help the driver to avoid an accident by applying torque to steer the road wheels independent of the action of the driver such as to help stay in a lane on a highway.

The motor generates torque in response to drive currents applied to the phases of the motor, and the value of these drive currents may be set by a controller in response to a demand torque from a signal processor. The demanded torque may, for instance, be proportional to the amount of torque applied to the steering wheel by a driver. A torque sensor may be provided which measures the steering wheel torque.

The value of the drive currents is typically set by a controller which outputs a signal or set of signals in response to an input torque demand signal. One suitable kind of controller that is commonly used with a motor in an electric power steering system is the PID controller. An exemplary prior art arrangement is shown in FIG. 4 of the drawings. In use a set point value Idq_set representing some demanded behaviour of the actuator, in this case the current demanded for the phases of a motor, is combined with a measure of that behaviour, in this case a measure of the actual currents Idq in the phases, to provide an error signal e indicative of the difference between what is demanded and what is actually happening. This error signal is fed into the PID controller which in turn outputs the signal for driving the motor that will cause it to track the setpoint value. The PID controller constantly adjusts the value of this output signal that is fed to the motor drive circuit so that the error signal is minimised and the tracking is achieved. This forms a closed loop control of the motor currents and can provide a highly accurate control for the actuator involved. By controlling the current, in combination with knowledge of the motor rotor position and other physical characteristics of the motor, full torque control can be achieved.

A PID controller is so called because it can use the three control terms, each typically expressed as a gain value Kp, Ki, Kd, which has a proportional, integral and derivative control effect on the signal output feedback from the control system. The principles are well known from the literature and can be expressed as:

SUMMARY

Referring to FIG. 1, a PID controller 1 for an actuator 2 or other controlled plant calculates an error value e(t) as the difference between a desired setpoint and the behaviour of the controlled plant and applies a correction based on the proportional, integral, and derivative control terms from the error. The controller attempts to minimize the error over time by adjustment of the control signal u(t). In the case of a plant comprising a three phased direct current motor, this control actuation signal may define the voltages that are to be applied to the motor for and may be fed to an inverter which in turn generates pulse width modulation signals that are applied to switches of an inverter.

The performance of the controller will depend significantly on the selection of the three gain terms, and the process of selecting the gain terms is known in the art as tuning of the controller. The gain terms will generally be set to fixed values during a design phase of the system, and may be modified to suit a particular application in a vehicle. As shown in FIG. 4 a look up table may be provided which enables different gain terms to be used in different conditions, such as at different vehicle speeds Vspd. A problem with the fixing of the gain terms is that over time the tuning can become suboptimal as the system they are controlling changes internally in the features away from that in the design phase, and they can be suboptimal for certain changes in the operating conditions of the vehicle.

The applicant has proposed an electric power steering system which ameliorates the limitations of prior art automotive electric power steering systems as described above.

According to a first aspect the disclosure provides an electric power assisted steering system for a vehicle which comprises:

an electric motor configured to apply an assistance torque to a part of a steering assembly so as to assist a driver of a vehicle in turning the steering wheel, a drive circuit for the motor which selectively connects the motor phases to an electrical supply to cause current to flow in the motor phases, the amount of assistance torque applied by the motor being a function of the current flowing in the phases of the motor, and a control circuit which generates a control signal that is applied to the motor drive stage, the control signal indicating the currents required in the motor phases, in which the control circuit comprises:

a PID controller which receives at an input a demand signal indicative of a required behaviour of the motor and provides at an output the control signal that is fed to the drive stage for the motor, the controller being arranged in a closed loop with the motor and configured to minimise an error value comprising the difference between the demanded behaviour as indicated by the demand signal and the actual behaviour of the motor, and a neural network which has an input layer of neurons, at least one hidden layer of neurons, and an output layer comprising at least one output neuron, in which the neural network comprises a feedforward neural network that receives at the input layer of input neurons the demand signal, the control signal output from the controller and the error value, and in which the neural network is configured to determine one or more of the P gain, I gain and D gain terms used by the PID controller, and further in which the neural network receives as an additional feedforward term at least one additional discrete environmental variable.

The applicant has appreciated that the use of a neural network in an electric power steering system to tune the gain terms of a PID controller which is fed with at least one additional discrete environmental variable allows for an additional degree of control of the electric motor in the steering system.

The demand signal may comprise a torque demand signal indicative of a torque that is required from the motor, and the measure of the motor behaviour may comprise a measurement of the motor torque. This may be obtained using a torque sensor.

In an exemplary arrangement, the demand signal input to the RID controller comprises a current demand signal Idq-_set indicative of the required motor current, for example expressed in the DQ frame of reference. In this case the measured or estimated actual behaviour may comprise the motor phase currents Idq, which may also be expressed in the same DQ frame. The demand signal may be generated from a torque target signal indicative of the torque demanded from the motor.

The additional discrete variable may be chosen such as to enable the neural network of the control circuit to automatically change the RID gains to adapt the plant variation (back emf) and uncertainties which may include one or more of current/torque tracking adaptation (P&I terms)
damping adaptation/stability robustness (D terms)
extra control freedoms for 1) motor speed, 2) current/ torque command The values of one or more of the P I and D terms used by the PID controller may be set directly by the neural network in real time. This may mean they are calculated periodically as the system is in use, for example once a second, or once a minute, or at some other preferred time interval which may be fixed or random in duration.

Providing a neural network configured to set these values on line during use of the system enhances motor tracking control and stability robustness to be enhanced over the prior art.

In an another exemplary arrangement, the neural network may be configured to set the values of one or more of the P I and D terms when the electric power steering system is offline, for instance during initial manufacture of the system. The neural network may store the value in a look up table for use by the controller in real time. In this case, the values may not be recalculated once the system is in use.

The neural network may be configured to periodically reset the values of the PI and D terms stored in the look up table in response to a trigger signal. This trigger signal may be generated whenever a certain set of conditions are satisfied, or may be supplied by a user of technician during a service or a reset of the system.

The neural network may be configured to determine one or more of the P I and gain values as respective nodal values within a hidden layer of the neural network.

By environmental variable we may mean a variable which is indicative of a parameter that is not used with the control loop of the PID controller.

The environmental variable may comprise at least one of the following commonly found in a vehicle motion control system:

the speed of the vehicle for most of the vehicle motion control,
the motor rotation speed/angle for the current/torque control, and
steering torque or angle The skilled person will understand that this is not intended to be an exhaustive list and other variables may be used within the scope of the disclosure.

The neural network may be fed with the demand signal input to the controller, and with an error signal that is calculated from the difference between the demand and the actual behaviour of the motor.

The neural network controller may be realised in the discrete control form.

The signals input to the neural network may be updated periodically, and between each update the neuron values may be updated in response prior to inputting updated values to the neural network.

Each of these variables will vary as the vehicle is operated, and providing the at least one additional variable at the input point to the neural network provides a degree of further adaptation to the control of the actuator, enabling the error value better to be minimised in accordance with the environmental conditions change in use.

The weights and the neurons of the neural network may be pre-set prior to first use of the neural network to define a set of values for the gains P, 1 and D which minimise the error value assuming that the system operates for the nominal internal and external conditions, and the environmental value has no influence.

The pre-set weights and neurons may be stored in an area of memory.

During use of the control system the weights may be updated by a gradient-descent backpropagation scheme each time a new set of input values is supplied to the neural network, and the updated weights combine with the input values are used to update the neurons.

The weight update step may be controlled by a learning strategy unit defining the profile and step for the update.

Expressed mathematically the inputs and outputs from the neural network may comprise:

$y^*\_set$ & $y^*$: discrete demand value(setpoint) & the measured behaviour of the motor, $e^*$: the tracking error$=y^*\_set - y^*$;

$u^*$: discrete PID control;

$U^*$: discrete environment variables

Kp, Ki and Kd: discrete P(proportional), ((integral), D(derivative) Control Gains respectively.

In an exemplary arrangement, the Neural Network is configured to perform a gradient descent learning for the inter-neuron weightings.

In an exemplary arrangement, the neural network may determine the weights using a backpropagation algorithm.

The or each environmental variable may be fed into the neutral network at an input layer. The control gains may be calculated as the neuron point values of respective neurons of a hidden layer of the neural network, and the control signal value may be generated at an output neuron of the neural network.

Once a new set of inputs have been fed to the input neurons of the neural network, the values of the hidden neurons will be calculated by a perceptron model upon the input values combined with the interneuron weightings applied between the input layer and the hidden layer.

The neural network may be configured to make the error term e(k) a minimum using so-called the gradient descent back-propagation algorithm to perform the weights W training and update for the error function minimisation, to achieve the optimal PID control gains (Kp, Ki and Kd), hence the desired PID control for the output signal.

The neural network may have a single hidden layer of neurons that connect the input layer neurons to the output layer.

The control circuit may include a a processor configured to carry out the following sequence of steps:

Input values to the neural network updated;

Weightings updated following the gradient descent back propagation scheme control combining with the input values, error and last control signal;

the neuron values update calculation from the perceptron model using the input neurons and the weighting gains (W) applied to connections between the input neurons and the hidden layer neurons;

Controller PID gain values updated based on the neuron values; and Control signal output from the controller generated by applying gains to the error signal input to the PID controller.

The processor may be configured such that the propagation of the signals through the neural network may be performed each time a new error signal is input to the PIE) controller and the output of the controller may only be generated once the neural network has completed the back propagation.

BRIEF DESCRIPTION OF DRAWINGS

There will now be described by way of example only, an exemplary arrangement of the present disclosure of which.

DETAILED DESCRIPTION

Figure 1:
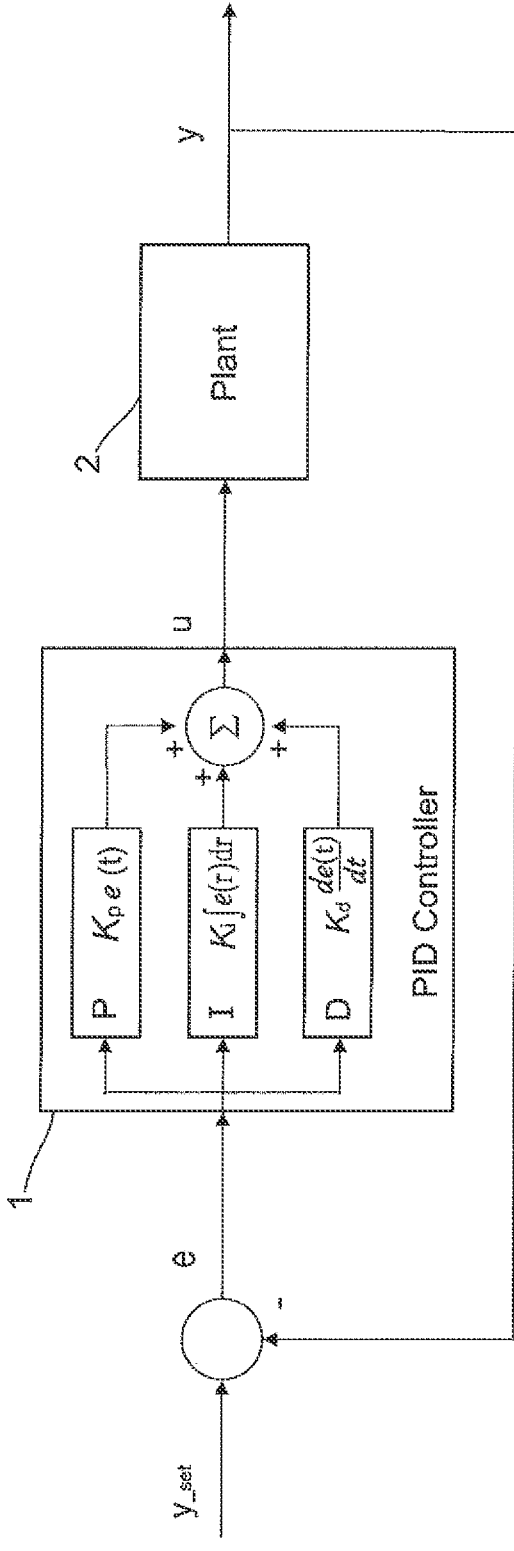
FIG. 1 is a schematic of a general PID Controller incorporated into a feedback loop where it controls the operation of a plant such as an electric motor.
Figure 2:
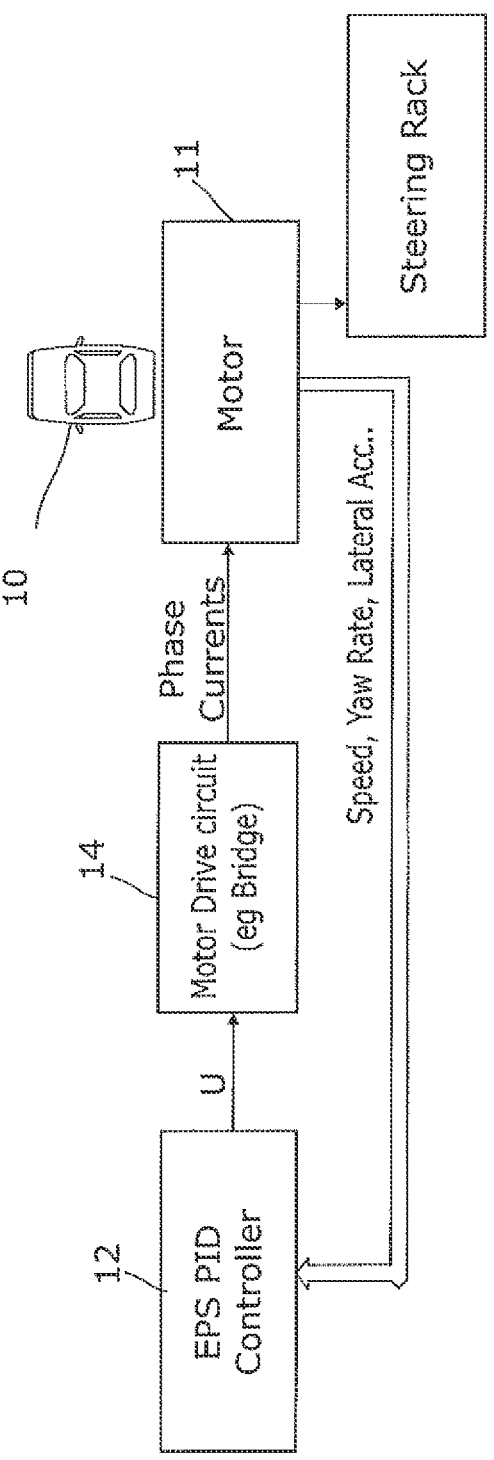
FIG. 2 is a schematic view of an electronic power steering (EPS) system that falls within the scope of an aspect of the disclosure.

As shown in the FIG. 2, a vehicle 10 is fitted with an electric power steering system (EPS)11 having an electric motor 11. The motor 11 of the EPS system comprises a multi-phase pulse width modulated synchronous motor that outputs a torque in response to a control signal output from a PID controller 12. The PID controller 12 and motor 11 form a closed feedback loop with a measurement of a parameter of the motor being fed back to the input side of the controller. In this example the measurement can be made of the motor phase currents (see FIG. 3(b))

Figure 3:
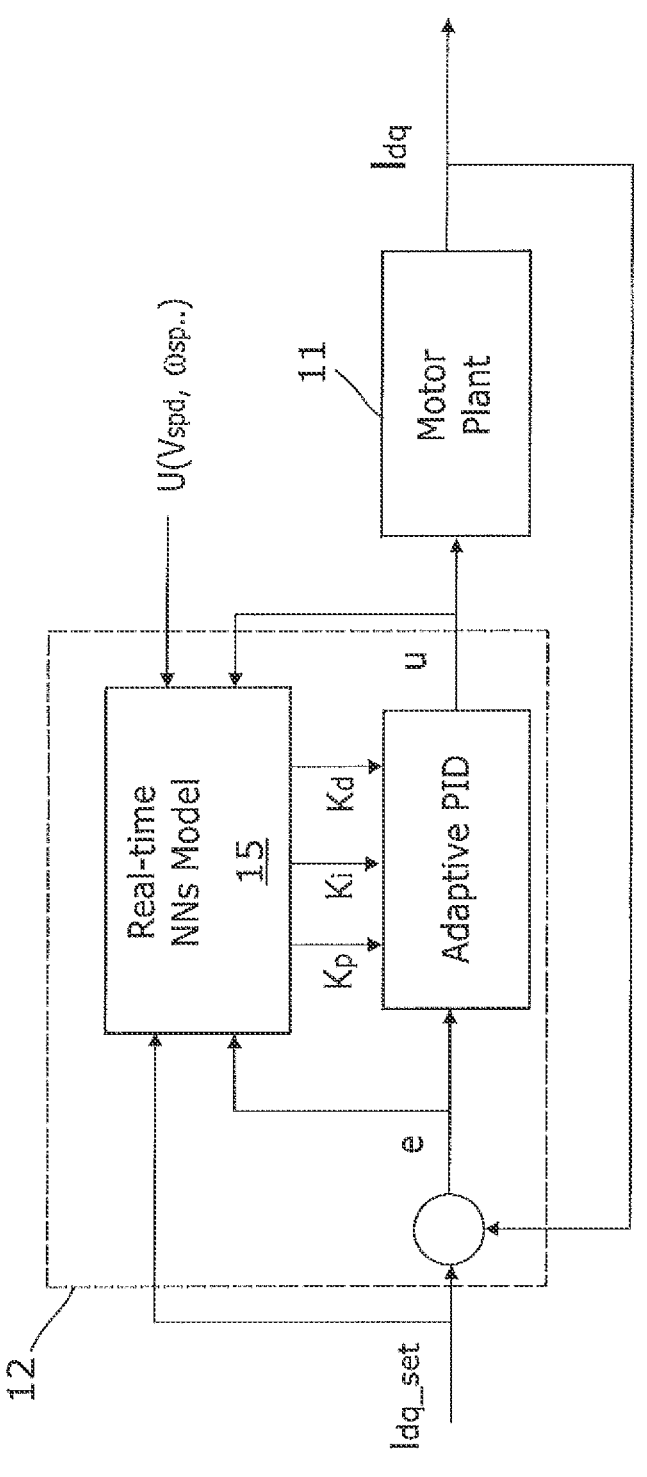
FIG. 3 is a schematic of the motor control circuit that is incorporated into the system of FIG. 2 and includes a neural network to determine the gains of a PIE) controller.

As shown in FIG. 3, the PID Controller 12 receives at an input a set point signal for the actuator which in this example is a demanded motor current value Idq-set and provides as an output a drive signal u that is fed to a motor drive circuit 14. The controller is configured to minimise an error value indicative of the difference between the demanded motor current and the measured motor current.

As is well known, the output of the PID controller—in this case the drive current value—is determined as a sum of three terms, a proportional term, an integral term and a differential term. Each term is calculated by multiplying the error signal value by a respective gain term Kp, Ki, and Kd.

Figure 4:
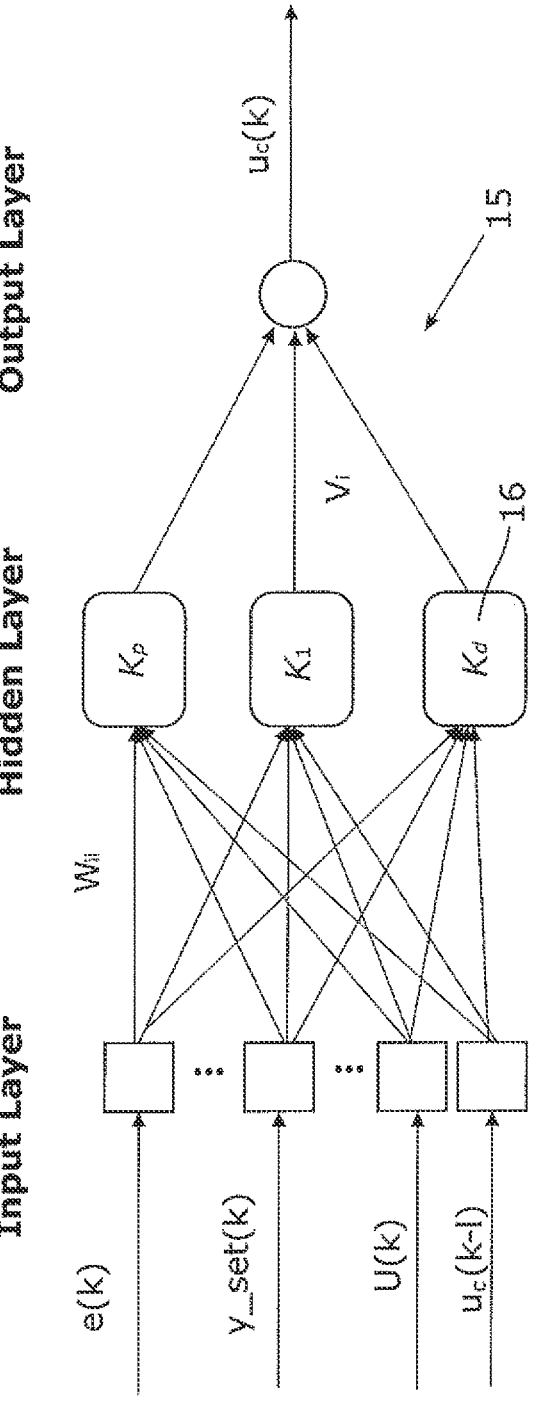
FIG. 4 shows the arrangement of neurons within the neural network of FIGS. 2 and 3.

These gain terms are calculated in the example of FIG. 2 by a neural network 15 as shown in FIG. 4. The neural network 15 comprises a set of neurons 16 which receive inputs, followed by the process to combine the inputs with their internal state and weights, and perform the neuron values calculation using an activation function, and produce output using an output function. The initial inputs are external data which in this example comprise environmental variables that are relevant to the torque control for the motor control, specifically the vehicle speed vspd and the motor speed.

The neurons 16 are arranged in a network of connections, each connection providing the output of one neuron as an input to another neuron. Each connection is assigned a weight that represents its relative importance. The propagation function computes the input to a neuron (activation function) from the outputs of its predecessor neurons and their connections as a weighted sum.

The specific neural network 15 used in the motor control example of FIG. 3 is a feedforward network with one hidden layer. The network has am input layer of neurons, an output layer comprising at least one output neuron, and at least on hidden layer of neurons. This is shown in FIG. 4. The neural network is configured to perform gradient-descent back-propagation learning to provide the P gain, I gain and D gain terms used by the PID controller. The neural network in this example is a single hidden layer neural network in which the hidden layer has three neurons, each neuron defining a value of a respective gain term for the RID controller. The neural network has a single output neuron defining the value of the drive signal for the motor.

Figure 5:
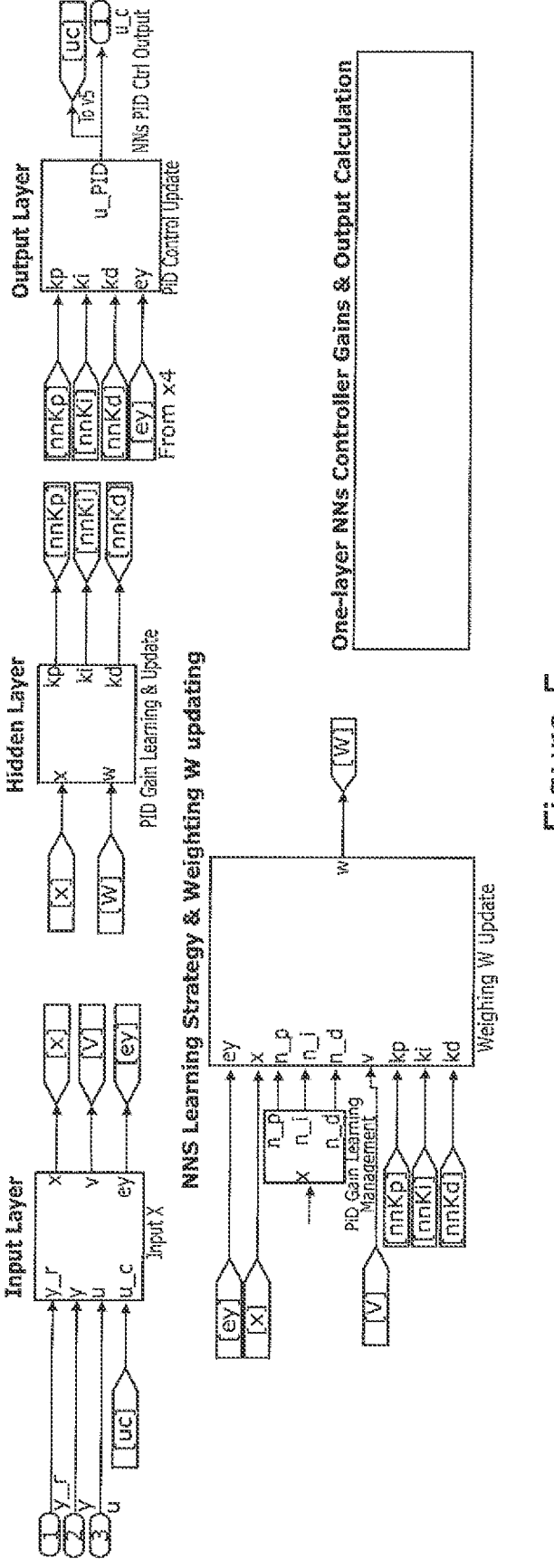
FIG. 5 shows the configuration and each the layer function block of the neural network PO controller implemented in Matlab/Simulink.

As shown in FIGS. 4&5 the neural network 15 receives at the input neurons the error value e, demand signal y_set, the control signal $u_c$ output from the PID controller.

The Neural network also receives as a feedforward term a number of additional discrete environmental variables. In this example one of the feedforward environmental variables can be the steering angle or the motor rotation speed. The value of this term is generated by a signal processor that receives the signal from the sensor.

The operation of the neural network and the discrete PID controller during use of the electronic system is as follows:

Step 1—the input values fed to the input layer neurons of the neural network are updated as is the set point signal fed to the PID controller;

Step 2: Obtain the kth step learning coefficient η(K) from the simple (adaptive) formula Step 3—The Weightings between neurons in the neural network are updated following a back-propagation scheme combining with the input values, previous control signal and learning coefficient update Step 4—The Controller gain values are updated based on the hidden layer neuron values calculation by the perceptron model from the input neurons and the weighting gains W applied to connections between the input neurons and the hidden layer neurons, Step 5—the updated control signal $u_c$ is output from the RID controller generated by applying gains to the error signal input to the RID controller;

Step 6—the system output, here the motor current, and the associated environment variable(s), are measured and the values are fed back to the input of the FED controller Step 7—repeat steps 1 to 6.

Figure 6:
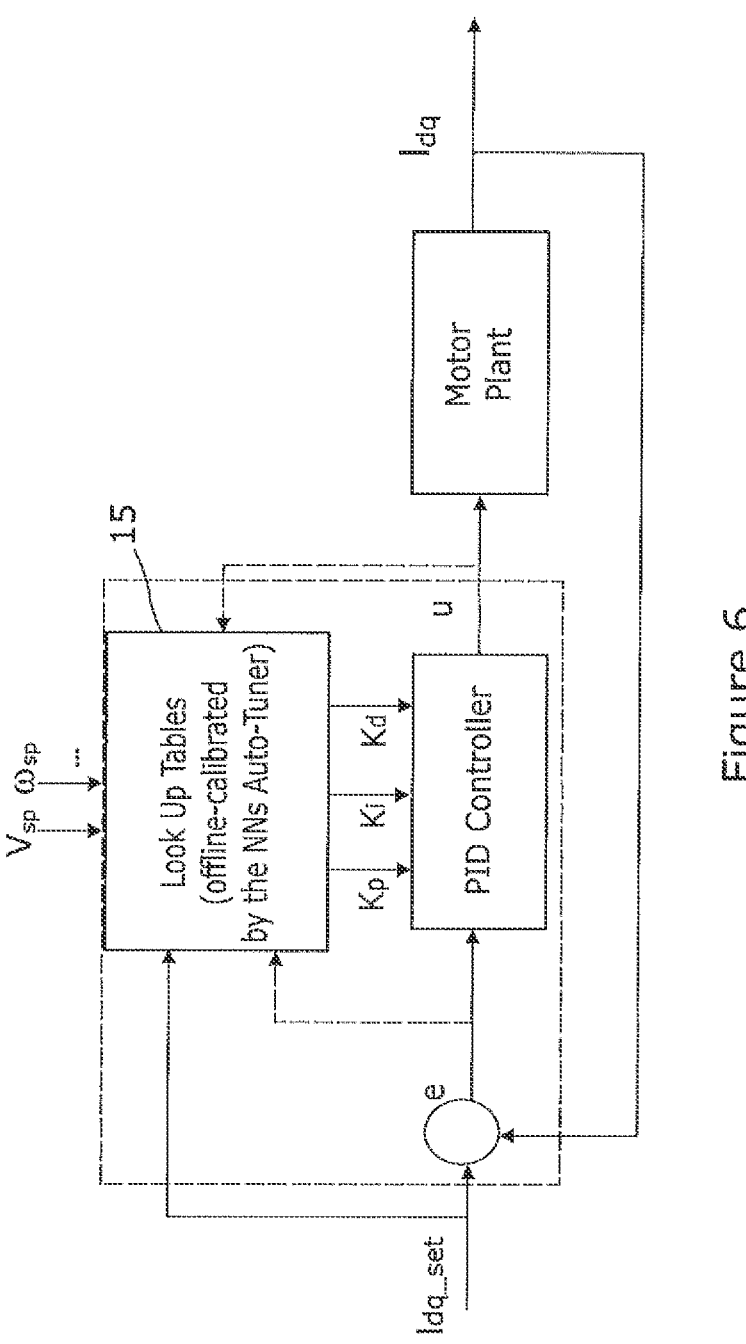
FIG. 6 is a schematic of another exemplary arrangement of a motor control circuit that can be used in the system of FIG. 2.

In a modification shown in FIG. 6 the neural network 15 does not constantly cycle through steps 1 to 7 during use of the EPS system. Instead, the EPS system controller uses P I and terms that are stored in a look up table that have been calculated by the neural network when the system is offline.

The invention claimed is:

1. An electric power assisted steering system for a vehicle comprising:

an electric motor configured to apply an assistance torque to a part of a steering assembly so as to assist a driver of a vehicle in turning the steering wheel, a drive circuit for the motor which selectively connects a plurality of motor phases to an electrical supply to cause current to flow in the motor phases, the amount of assistance torque applied by the motor being a function of the current flowing in the phases of the motor, a control circuit configured to generate a control signal that is applied to the motor drive stage, the control signal indicating phase-resolved currents required in the motor phases, the control circuit comprising:

a PID controller configured to receive at an input a demand signal indicative of a required behaviour of the motor and provides, at an output the control signal that is fed to the drive stage for the motor, the controller arranged in a closed loop configuration with the motor and configured to minimise an error value comprising the difference between the demanded behaviour and the actual motor behaviour, and a neural network including an input layer of neurons, at least one hidden layer of neurons, and an output layer, wherein the neural network is a feedforward neural network configured to:

receives, at its input layer (i) the demand signal, (ii) the control signal output from the PID controller, the error value, and (iv) at least one environmental variable not used in the PID control loop;

compute proportiona (P gain), integral (I gain), and derivative (D gain) gain terms as respective neuron values internal to the hidden layer; and update the proportional, integral and derivative gain terms in real time using gradient-descent backpropagation in response to each computed error signal so as to adaptively tune the controller to electrical, mechanical and operating-condition variations on the steering system.

2. A system according to claim 1 in which the demand signal comprises a torque demand signal indicative of a torque that is required from the motor, and the measure of the motor behaviour comprises a measurement of the motor torque.

3. A system according to claim 1 in which the demand signal input to the PID controller comprises a current demand signal Idq_set indicative of the required motor current.

4. A system according to claim 1 in which the values of one or more of the P I and D terms used by the PID controller are set directly by the neural network in real time.

5. A system according to claim 1 in which the neural network is configured to set the values of one or more of the P I and D terms when the electric power steering system is offline and to store the values in a look up table for use by the controller in real time.

6. A system according to claim 1 in which the neural network is configured to determine one or more of the P I and D gain values as respective nodal values within a hidden layer of the neural network.

7. A system according to claim 1 in which the environmental variable comprises at least one of the following:

the speed of the vehicle, the motor rotation speed/angle for the current/torque control, and steering torque or angle.

8. An electric power assisted steering system for a vehicle comprising: an electric motor configured to apply an assistance torque to a part of a steering assembly so as to assist a driver of a vehicle in turning the steering wheel, a drive circuit for the motor configured to selectively connect motor phases to an electrical supply to cause current to flow in the motor phases, the amount of assistance torque applied by the motor being a function of the current flowing in the phases of the motor, and a control circuit configured to generate a control signal that is applied to the motor drive stage, the control circuit comprising:

a PID controller configured to receive at an input a demand signal indicative of a required behaviour of the motor and provides at an output the control signal that is fed to the drive stage for the motor, the controller arranged in a closed loop configuration with the motor and configured to minimise an error value comprising the difference between the demanded behaviour as indicated by the demand signal and the actual behaviour of the motor, and a neural network including an input layer of neurons, at least one hidden layer of neurons, and an output layer comprising at least one output neuron, the neural network comprising a feedforward neural network that receives at the input layer of input neurons the demand signal, the control signal output from the controller and the error value, wherein the neural network is configured to determine one or more of the P gain, gain and D gain terms used by the PID controller, wherein the neural network receives as an additional feedforward term at least one additional discrete environmental variable, and wherein the neural network is configured to set the values of one or more of the P I and D terms when the electric power steering system is offline and to store the values in a look up table for use by the controller in real time.

9. A system according to claim 8 in which the demand signal comprises a torque demand signal indicative of a torque that is required from the motor, and the measure of the motor behaviour comprises a measurement of the motor torque.

10. A system according to claim 8 in which the demand signal input to the PID controller comprises a current demand signal Idq_set indicative of the required motor current.

11. A system according to claim 8 in which the values of one or more of the P I and D terms used by the PID controller are set directly by the neural network in real time.

12. A system according to claim 8 in which the neural network is configured to determine one or more of the P I and D gain values as respective nodal values within a hidden layer of the neural network.

13. A system according to claim 8 in which the environmental variable comprises at least one of the following:

the speed of the vehicle, the motor rotation speed/angle for the current/torque control, and steering torque or angle.

14. An electric power assisted steering system for a vehicle comprising:

an electric motor configured to apply an assistance torque to a part of a steering assembly so as to assist a driver of a vehicle in turning the steering wheel, a drive circuit for the motor which selectively connects the motor phases to an electrical supply to cause current to flow in the motor phases, the amount of assistance torque applied by the motor being a function of the current flowing in the phases of the motor, and a control circuit configured to generate a control signal that is applied to the motor drive stage, the control signal indicating the currents required in the motor phases, in which the control circuit comprises:

a PID controller configured to receive at an input a demand signal that comprises a current demand signal Idq_set indicative of the required motor current of a required behaviour of the motor and provides at an output the control signal that is fed to the drive stage for the motor, the controller arranged in a closed loop configuration with the motor and configured to minimise an error value comprising the difference between the demanded behaviour as indicated by the demand signal and the actual behaviour of the motor, and a neural network which has including an input layer of neurons, at least one hidden layer of neurons, and an output layer comprising at least one output neuron, in which the neural network comprises a feedforward neural network that receives at the input layer of input neurons the demand signal, the control signal output from the controller and the error value and in which the neural network is configured to determine one or more of the P gain, I gain and D gain terms used by the PID controller, and further in which the neural network receives as an additional feedforward term at least one additional discrete environmental variable.

\*　　\*　　\*　　\*　　\*